(12) United States Patent
Chen et al.

(10) Patent No.: US 9,501,548 B2
(45) Date of Patent: Nov. 22, 2016

(54) DATA UPDATING METHOD, SYSTEM AND DEVICE

(71) Applicant: ZTE Corporation, Shenzhen, Guangdong (CN)

(72) Inventors: Jinchang Chen, Shenzhen (CN); Xiaoping Chen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/427,282

(22) PCT Filed: Jun. 7, 2013

(86) PCT No.: PCT/CN2013/076961
§ 371 (c)(1),
(2) Date: Mar. 10, 2015

(87) PCT Pub. No.: WO2013/170796
PCT Pub. Date: Nov. 21, 2013

(65) Prior Publication Data
US 2015/0227604 A1 Aug. 13, 2015

(30) Foreign Application Priority Data
Sep. 20, 2012 (CN) .......................... 2012 1 0351643

(51) Int. Cl.
*G06F 15/177* (2006.01)
*G06F 17/30* (2006.01)
*H04L 12/24* (2006.01)

(52) U.S. Cl.
CPC ... *G06F 17/30581* (2013.01); *G06F 17/30327* (2013.01); *G06F 17/30345* (2013.01);
(Continued)

(58) Field of Classification Search
CPC .... H04L 12/24; H04L 12/2424; H04L 43/04
See application file for complete search history.

(56) References Cited

U.S. PATENT DOCUMENTS

2006/0168322 A1   7/2006   Gray
2009/0031011 A1   1/2009   Kim
(Continued)

FOREIGN PATENT DOCUMENTS

| CN | 1980144 A | 6/2007 |
|---|---|---|
| CN | 101242302 A | 8/2008 |
| GB | 2420673 A | 5/2006 |
| WO | 2009026851 A1 | 3/2009 |

OTHER PUBLICATIONS

International Search Report in international application No. PCT/CN2013/076961, mailed on Sep. 19, 2013.
(Continued)

*Primary Examiner* — Yves Dalencourt
(74) *Attorney, Agent, or Firm* — Oppedahl Patent Law Firm LLC

(57) ABSTRACT

A data updating method is provided, which includes generating Managed Object Instances (MOIs) and an operation identifier of each MOI according to a management operation needed to be performed on an Network Element (NE) device; selecting MOIs in an association relation from the generated MOIs; generating a dynamic MOI and an operation identifier of the dynamic MOI according to the selected MOIs, the dynamic MOI including attribute values corresponding to the operation identifiers of the selected MOIs and the operation identifier of the dynamic MOI including the operation identifiers of the selected MOIs; transmitting the dynamic MOI and the operation identifier of the dynamic MOI to the NE device; and the NE device searches a Managed Object (MO) tree for an MOI node matched with the attribute values of the dynamic MOI after receiving the dynamic MOI and the operation identifier of the dynamic MOI, and updates the matched MOI node according to the operation identifier of the dynamic MOI. A data synchronization system and an NE device are also provided.

15 Claims, 3 Drawing Sheets

An NE management device generates MOIs and an operation identifier of each MOI according to a management operation needed to be performed on an NE device, selects MOIs in an association relation from the generated MOIs, generates a dynamic MOI and an operation identifier of the dynamic MOI according to the selected MOIs, the dynamic MOI including attribute values corresponding to the operation identifiers of the selected MOIs and the operation identifier of the dynamic MOI including the operation identifiers of the selected MOIs, and transmits the dynamic MOI and the operation identifier of the dynamic MOI to the NE device — 10

The NE device searches an MO tree for an MOI node matched with the attribute values of the dynamic MOI after receiving the dynamic MOI and the operation identifier of the dynamic MOI, and updates the matched MOI node according to the operation identifier of the dynamic MOI — 11

(52) U.S. Cl.
CPC ......... *G06F17/30864* (2013.01); *H04L 12/24* (2013.01); *H04L 41/0233* (2013.01); *H04L 41/082* (2013.01)

(56) References Cited

U.S. PATENT DOCUMENTS

| | | | |
|---|---|---|---|
| 2011/0035480 A1 | 2/2011 | Lyou | |
| 2014/0223008 A1* | 8/2014 | Song | H04L 12/24 709/224 |
| 2015/0319131 A1* | 11/2015 | Park | H04L 41/0233 709/245 |

OTHER PUBLICATIONS

English Translation of the Written Opinion of the International Search Authority in international application No. PCT/CN2013/076961, mailed on Sep. 19, 2013.
Supplementary European Search Report in European application No. 13790936.2, mailed on Jul. 6, 2015.
OMA Device Management Tree and Description, Feb. 9, 2007.
The Design and Implementation of a High Performance Management Information Tree for a TMN Platform, Dec. 17, 1998.

* cited by examiner

Fig. 1

An NE management device generates MOIs and an operation identifier of each MOI according to a management operation needed to be performed on an NE device, selects MOIs in an association relation from the generated MOIs, generates a dynamic MOI and an operation identifier of the dynamic MOI according to the selected MOIs, the dynamic MOI including attribute values corresponding to the operation identifiers of the selected MOIs and the operation identifier of the dynamic MOI including the operation identifiers of the selected MOIs, and transmits the dynamic MOI and the operation identifier of the dynamic MOI to the NE device — 10

The NE device searches an MO tree for an MOI node matched with the attribute values of the dynamic MOI after receiving the dynamic MOI and the operation identifier of the dynamic MOI, and updates the matched MOI node according to the operation identifier of the dynamic MOI — 11

DATA UPDATING METHOD, SYSTEM AND DEVICE

TECHNICAL FIELD

The disclosure relates to a data updating technology, and in particular to a data updating method, system and device.

BACKGROUND

A communication network consists of multiple communication nodes which are called Network Elements (NE). An Element Management System (EMS) is configured to manage the NEs and provide a management function for configuration, failure, performance and the like.

A basic unit for configuring a business rule is called an object, and is called a Managed Object (MO) in a 3rd Generation Partnership Project (3GPP) standard. The object consists of a group of attributes, and the MOs with the same attribute set are collectively called a Managed Object Class (MOC). A specific object instance is called a Managed Object Instance (MOI). The core of EMS configuration management is a network manager configuration data model, including MOCs and their association relations, and a model of a communication network is presented in a form of MO tree at present. The core of NE configuration management is an NE configuration data model, which is presented in a form of table in a relational database at present.

A configuration management function is to configure MO data for the NE by a network manager and update the data to the NE to validate a manageable object represented by MO on a managed network. In the NE, configuration data acquired from the network manager and presented in the form of MOI is stored in a memory in the form of MO tree, and then the network manager configuration data in the form of MOI is converted into NE configuration data according to a corresponding relation between the network manager configuration data model and the NE configuration data model.

A configuration data synchronization manner between the EMS and the NE includes a total data synchronization manner and an incremental data synchronization manner, and a total data synchronization process and an incremental data synchronization process are independent from each other. In the incremental data synchronization manner, a conventional universal method is that the EMS executes own defined comparison rule, forms an incremental data file by MOIs involved in current operation and corresponding operation identifiers in the form of Extensible Markup Language (XML) and transmits the incremental data file to the NE to notify the NE to perform incremental data synchronization. After the NE acquires the incremental data file, the NE parses the incremental data file to obtain the MOIs, looks up corresponding locations of the MOIs one by one in the MO tree, and adds, deletes or modifies the MOIs according to the operation identifiers of the MOIs.

The above method has the defects as follows: when the EMS modifies a single attribute of an object which satisfies a condition, it is necessary to transmit all the MOIs satisfying the condition to the NE. It is needed within the NE to look up the locations of all the MOIs issued by the network manager in the MO tree, and to process one by one, during which the lookup may be repeated for a class of MOIs with higher relevancy, thus resulting in low efficiency.

SUMMARY

The embodiments of the disclosure provide a data updating method, system and device, so as to improve the efficiency of updating MOIs in an MO tree by NE device.

A data updating method includes that:

NE management device generates MOIs and an operation identifier of each MOI according to a management operation needed to be performed on NE device, selects MOIs in an association relation from the generated MOIs, generates a dynamic MOI and an operation identifier of the dynamic MOI according to the selected MOIs, wherein the dynamic MOI including attribute values corresponding to the operation identifiers of the selected MOIs and the operation identifier of the dynamic MOI including the operation identifiers of the selected MOIs, and transmits the dynamic MOI and the operation identifier of the dynamic MOI to the NE device; and the NE device searches an MO tree for an MOI node matched with attribute values of the dynamic MOI after receiving the dynamic MOI and the operation identifier of the dynamic MOI, and updates the matched MOI node according to the operation identifier of the dynamic MOI.

A data synchronization system includes:

An NE management device, configured to generate MOIs and an operation identifier of each MOI according to a management operation needed to be performed on an NE device, to select MOIs in an association relation from the generated MOIs, generate a dynamic MOI and an operation identifier of the dynamic MOI according to the selected MOIs, wherein the dynamic MOI including attribute values corresponding to the operation identifiers of the selected MOIs and the operation identifier of the dynamic MOI including the operation identifier of each selected MOI, and to transmit the dynamic MOI and the operation identifier of the dynamic MOI to the NE device; and the NE device, configured to search an MO tree for an MOI node matched with attribute values of the dynamic MOI after receiving the dynamic MOI and the operation identifier of the dynamic MOI, and to update the matched MOI node according to the operation identifier of the dynamic MOI.

An NE management device includes:

a network manager adaptation module, configured to generate MOIs and an operation identifier of each MOI according to a management operation needed to be performed on an NE device, to select MOIs in an association relation from the generated MOIs, and to generate a dynamic MOI and an operation identifier of the dynamic MOI according to the selected MOIs, wherein the dynamic MOI including attribute values corresponding to the operation identifiers of the selected MOIs and the operation identifier of the dynamic MOI including the operation identifier of each selected MOI; and a configuration interface module, configured to transmit the dynamic MOI and the operation identifier of the dynamic MOI to the NE device.

An NE device includes:

an NE adaptation module, configured to receive a dynamic MOI and an operation identifier of the dynamic MOI from NE management device, to search an MO tree for an MOI node matched with attribute values of the dynamic MOI, and to update the matched MOI node according to the operation identifier of the dynamic MOI; and a configuration data storage module, configured to store the MO tree.

In the schemes provided by the embodiments of the disclosure, an NE management device selects MOIs in the association relation from the generated MOIs after generating MOIs and an operation identifier of each MOI according to a management operation needed to be performed on the NE device, generates a dynamic MOI and an operation identifier of the dynamic MOI according to the selected MOIs, and transmits the dynamic MOI and the operation identifier of the dynamic MOI to an NE device; and the NE device searches an MO tree for an MOI node matched with the attribute values of the dynamic MOI, and updates the matched MOI node according to the operation identifier of the dynamic MOI. In the schemes, the NE management device generates a dynamic MOI and an operation identifier of the dynamic MOI for the MOIs in the association relation, and then the NE device is only required to search the MO tree for the MOI node matched with the attribute values of the dynamic MOI, and does not need to search for the location of each MOI in an association relation in the MO tree, so that a lookup workload of the NE device is reduced, and the efficiency of updating the MOIs in the MO tree by the NE device is further improved.

BRIEF DESCRIPTION OF THE DRAWINGS

FIG. 1 is a flowchart of a method provided by an embodiment of the disclosure;

DETAILED DESCRIPTION

Figure 2:
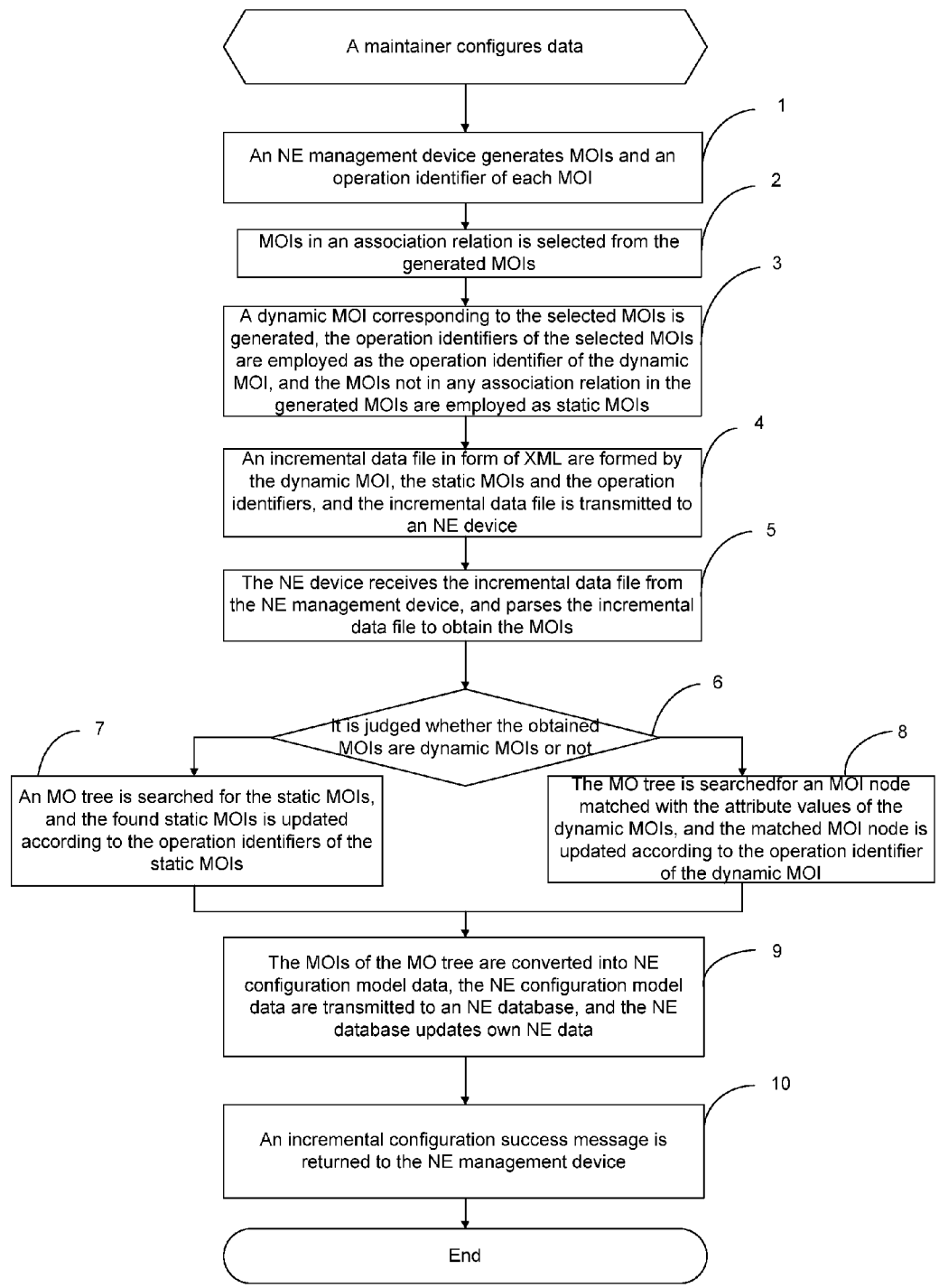
FIG. 2 is a specific flowchart according to an embodiment of the disclosure.

In order to improve the efficiency of updating MOIs by an NE device, an embodiment of the disclosure provides a data updating method. In the method, an NE management device selects MOIs in an association relation from generated MOIs after generating the MOIs and an operation identifier of each MOI according to a management operation needed to be performed on the NE device, generates a dynamic MOI and an operation identifier of the dynamic MOI according to the selected MOIs, and transmits the dynamic MOI and the operation identifier of the dynamic MOI to the NE device; and the NE device searches an MO tree for an MOI node matched with attribute values of the dynamic MOI, and updates the matched MOI node according to the operation identifier of the dynamic MOI.

As shown in FIG. 1, a data updating method provided by an embodiment of the disclosure includes the following steps that:

Step 10: an NE management device generates MOIs and an operation identifier of each MOI according to a management operation needed to be performed on an NE device, selects MOIs in an association relation from the generated MOIs, generates a dynamic MOI and an operation identifier of the dynamic MOI according to the selected MOIs, the dynamic MOI including attribute values corresponding to the operation identifiers of the selected MOIs and the operation identifier of the dynamic MOI including the operation identifiers of the selected MOIs, and transmits the dynamic MOI and the operation identifier of the dynamic MOI to the NE device;

wherein the NE management device generates the MOIs and the operation identifier of each MOI according to the management operation needed to be performed on the NE device by way of: generating MOIs involved in the management operation needed to be performed on the NE device, and then generating the operation identifiers corresponding to the MOIs according to the management operation, and for example, if the management operation needed to be performed on the NE device is to modify a cell identifier of cell 1, then an MOI involved in the management operation and corresponding to the cell 1 is generated, wherein attribute values of the MOI includes the cell identifier of the cell 1 and other attribute values of the cell 1, and an operation identifier generated corresponding to the MOI is the operation identifier corresponding to cell identifier modification operation; and Step 11: the NE device searches an MO tree for an MOI node matched with the attribute values of the dynamic MOI after receiving the dynamic MOI and the operation identifier of the dynamic MOI, and updates the matched MOI node according to the operation identifier of the dynamic MOI.

Specifically, in Step 10, the selection of MOIs in an association relation from the generated MOIs may be implemented by ways of:

selecting MOIs belonging to the same MOC and with the same operation identifier; or selecting MOIs belonging to the same MOC; or selecting MOIs with the same operation identifier; or selecting MOI with the same father node.

Of course, rules for selecting MOIs in an association relation are not limited to the above, and any preset selection rule falls within the scope of protection of the disclosure.

Specifically, in Step 10, the generation of the dynamic MOI and the operation identifier of the dynamic MOI according to the selected MOIs may be implemented by a following way of:

matching the selected MOIs with a dynamic MOC in a dynamic MO template library; and generating the dynamic MOI corresponding to the selected MOIs according to the matched dynamic MOC, and employing the operation identifiers of the selected MOIs as the operation identifier of the dynamic MOI;

wherein the dynamic MOC in the dynamic MO template library includes a main attribute and at least one auxiliary attribute, and the attributes included in the dynamic MOC include at least one attribute included in static MOCs in an association relation in a network manager configuration data model. The association relation between the static MOCs may be preset, and includes a father-son relation, a reference relation and the like, wherein the father-son relation is defined as follows: if one static MOC exists depending on another static MOC, the two static MOCs have a father-son relation, the static MOC which exists depending on the other static MOC is called a father MOC, and the other static MOC is called a child MOC; and the reference relation is defined as follows: if one static MOC refers to another static MOC, the two static MOCs have a reference relation, the static MOC referring to the other static MOC is called a reference MOC, and the referred static MOC is called a referred MOC.

Specifically, the matching of the selected MOIs with the dynamic MOC in the dynamic MO template library may be implemented by a following way of:

searching the dynamic MO template library for a dynamic MOC including the attributes of the selected MOIs, and employing the found dynamic MOC as the matched dynamic MOC; and correspondingly, the generation of the dynamic MOI corresponding to the selected MOIs according to the matched dynamic MOC may be implemented by a following way of:

generating a dynamic MOI including a main attribute value and at least one auxiliary attribute value, wherein the main attribute value included in the dynamic MOI is an attribute value of the main attribute in the matched dynamic MOC corresponding to the selected MOIs, and the auxiliary attribute values included in the dynamic MOI are attribute values of the auxiliary attributes in the matched dynamic MOC corresponding to the selected MOIs. For example, if two MOIs are selected, one MOI includes an attribute value A1 and an attribute value B1, the other MOI includes an attribute value A2 and an attribute value B2, the two MOIs have the same father MOI, the matched dynamic MOC includes a main attribute C and an auxiliary attribute A, and C is the attribute of the father MOI of the two MOIs, then a main attribute value included in the generated dynamic MOI is an attribute value of the attribute C included in the father MOI of the two MOIs, and auxiliary attribute values included in the dynamic MOI include A1 and A2.

Correspondingly, in Step 11, the searching of the MO tree for the MOI node matched with the attribute values of the dynamic MOI may be implemented by a following way of:

searching the MO tree for the MOI node including the main attribute value of the dynamic MOI, matching attribute values in an MOI node (such as a child node of the found MOI node and/or a referred node) having an association relation with the found MOI node with the auxiliary attribute values of the dynamic MOI, and determining the successfully matched MOI node as the MOI node matched with the attribute values of the dynamic MOI.

Furthermore, while transmitting the dynamic MOI and the operation identifier of the dynamic MOI to the NE device, the NE management device transmits a static MOI and an operation identifier of the static MOI to the NE device; and the static MOI is included in the generated MOIs, but is not in any association relation; and the NE device searches the MO tree for the static MOI after receiving the static MOI and the operation identifier of the static MOI, and updates the static MOI according to the operation identifier of the static MOI.

When transmitting the dynamic MOI, the operation identifier of the dynamic MOI, the static MOI and the operation identifier of the static MOI to the NE device, the NE management device may generate an incremental data file in the form of XML by the dynamic MOI, the operation identifier of the dynamic MOI, the static MOI and the operation identifier of the static MOI, and then transmits the incremental data file to the NE device, and the NE device parses the incremental data file to obtain the dynamic MOI, the operation identifier of the dynamic MOI, the static MOI and the operation identifier of the static MOI from the incremental data file.

The disclosure is described below with reference to specific embodiments.

As shown in FIG. 2, a specific flow is as follows:

Step 1: an NE management device generates MOIs and an operation identifier of each MOI according to a management operation needed to be performed on an NE device;

Step 2: the NE management device selects MOIs in an association relation from the generated MOIs;

Step 3: the NE management device matches the selected MOIs with a dynamic MOC in a dynamic MO template library, generates a dynamic MOI corresponding to the selected MOIs according to the matched dynamic MOC, employs the operation identifiers of the selected MOIs as an operation identifier of the dynamic MOI, and employs the MOIs not in any association relation in the generated MOIs as static MOIs;

Step 4: the NE management device generates an incremental data file in the form of XML by the dynamic MOI, the operation identifier of the dynamic MOI, the static MOIs and the operation identifiers of the static MOIs, and transmits the incremental data file to the NE device;

Step 5: the NE device receives the incremental data file from the NE management device, and parses the incremental data file to obtain the MOIs;

Step 6: the NE device judges whether the obtained MOIs are dynamic MOIs or not, Step 8 is then executed if the obtained MOIs are dynamic MOIs, otherwise Step 7 is then executed;

Step 7: the NE device searches an MO tree for the static MOIs, updates the static MOIs according to the operation identifiers of the static MOIs, and Step 9 is executed;

Step 8: the NE device searches the MO tree for an MOI node matched with attribute values of the dynamic MOI, and updates the matched MOI node according to the operation identifier of the dynamic MOI;

Step 9: the NE device converts the MOIs in the MO tree into NE configuration model data according to a corresponding relation between a network manager data model and an NE data model, and transmits the NE configuration model data to an NE database, and the NE database updates own NE data; and Step 10: the NE device returns an incremental configuration success message to the NE management device.

Figure 3:
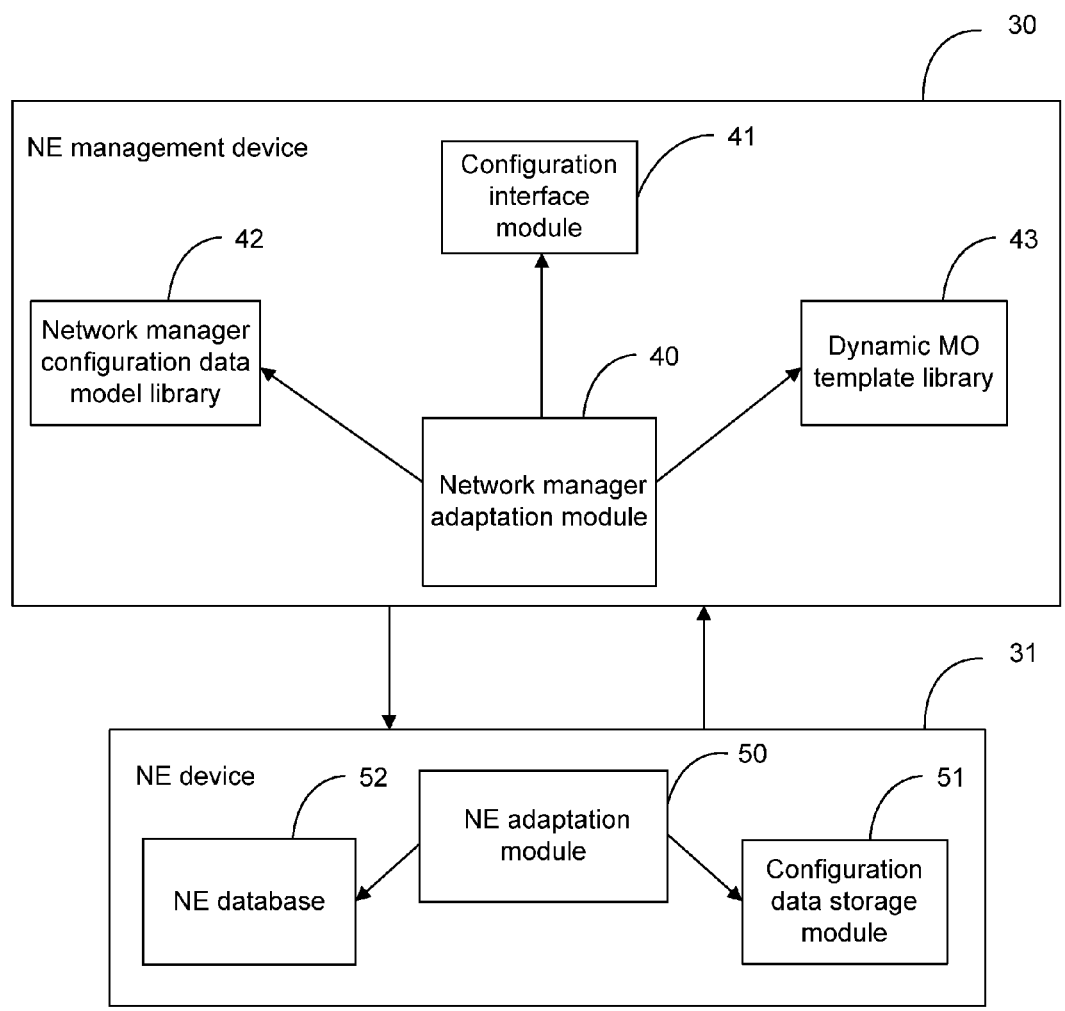
FIG. 3 is a structure diagram of a system provided by an embodiment of the disclosure.

As shown in FIG. 3, an embodiment of the disclosure provides a data updating system, which includes:

an NE management device 30, configured to generate MOIs and an operation identifier of each MOI according to a management operation needed to be performed on an NE device, to select MOIs in an association relation from the generated MOIs, generate a dynamic MOI and an operation identifier of the dynamic MOI according to the selected MOIs, the dynamic MOI including attribute values corresponding to the operation identifiers of the selected MOIs and the operation identifier of the dynamic MOI including the operation identifiers of the selected MOIs, and to transmit the dynamic MOI and the operation identifier of the dynamic MOI to the NE device; and the NE device 31, configured to search an MO tree for an MOI node matched with the attribute values of the dynamic MOI after receiving the dynamic MOI and the operation identifier of the dynamic MOI, and update the matched MOI node according to the operation identifier of the dynamic MOI.

Still as shown in FIG. 3, the embodiment of the disclosure provides an NE management device, which may be applied to a data updating system, and the NE management device includes:

a network manager adaptation module 40, configured to generate MOIs and an operation identifier of each MOI according to a management operation needed to be performed on an NE device, select MOIs in an association relation from the generated MOIs, and generate a dynamic MOI and an operation identifier of the dynamic MOI according to the selected MOIs, the dynamic MOI including attribute values corresponding to the operation identifiers of the selected MOIs and the operation identifier of the dynamic MOI including the operation identifiers of the selected MOIs, wherein the network manager adaptation module 40 may generate the MOIs according to MOCs stored in a network manager configuration data model library 42; and a configuration interface module 41, configured to transmit the dynamic MOI and the operation identifier of the dynamic MOI to the NE device.

Furthermore, the network manager adaptation module 40 is configured to select the MOIs in the association relation from the generated MOIs by the following ways of:

selecting MOIs belonging to the same MOC and with the same operation identifier; or selecting MOIs belonging to the same MOC; or selecting MOIs with the same operation identifier; or selecting MOI with the same father node.

Furthermore, the network manager adaptation module 40 is configured to generate the dynamic MOI and the operation identifier of the dynamic MOI according to the selected MOIs by a following way of:

matching the selected MOIs with a dynamic MOC in a dynamic MO template library 43; and generating the dynamic MOI corresponding to the selected MOIs according to the matched dynamic MOC, and employing the operation identifiers of the selected MOIs as the operation identifier of the dynamic MOI;

wherein the dynamic MOC in the dynamic MO template library includes a main attribute and at least one auxiliary attribute, and the attributes included in the dynamic MOC are composed of at least one attribute included in static MOCs in an association relation in a network manager configuration data model.

Furthermore, the network manager adaptation module 40 is configured to match the selected MOIs with the dynamic MOC in the dynamic MO template library and generate the dynamic MOI corresponding to the selected MOIs according to the matched dynamic MOC by the following way of:

searching the dynamic MO template library for a dynamic MOC including the attributes of the selected MOIs, and employing the found dynamic MOC as the matched dynamic MOC; and generating the dynamic MOI including a main attribute value and at least one auxiliary attribute value, wherein the main attribute value included in the dynamic MOI is an attribute value of the main attribute in the matched dynamic MOC corresponding to the selected MOIs, and the auxiliary attribute values included in the dynamic MOI are attribute values of the auxiliary attributes in the matched dynamic MOC corresponding to the selected MOIs.

Furthermore, the configuration interface module 41 is further configured to transmit a static MOI and an operation identifier of the static MOI to the NE device at the same time of transmitting the dynamic MOI and the operation identifier of the dynamic MOI to the NE device, wherein the static MOI is included in the generated MOIs, and is not in any association relation.

Still as shown in FIG. 3, an embodiment of the disclosure provides an NE device, which may be applied to a data updating system, and the NE device includes:

an NE adaptation module 50, configured to receive a dynamic MOI and an operation identifier of the dynamic MOI from an NE management device, to search an MO tree for an MOI node matched with attribute values of the dynamic MOI, and to update the matched MOI node according to the operation identifier of the dynamic MOI; and a configuration data storage module 51, configured to store the MO tree formed by MOI data configured by the NE management device.

Furthermore, the NE adaptation module 50 is configured to search the MO tree for an MOI node including the main attribute value of the dynamic MOI, to match attribute values in an MOI node having an association relation with the found MOI node with the auxiliary attribute values of the dynamic MOI, to determine the successfully matched MOI node as the MOI node matched with the attribute values of the dynamic MOI, and to update the matched MOI node according to the operation identifier of the dynamic MOI.

Furthermore, the NE adaptation module 50 is further configured to:

receive a static MOI and an operation identifier of the static MOI while receiving the dynamic MOI and the operation identifier of the dynamic MOI; and search the MO tree for the static MOI and update the static MOI according to the operation identifier of the static MOI.

Furthermore, the NE adaptation module 50 is further configured to:

convert the MOIs in the MO tree into NE configuration model data according to a corresponding relation between a network manager data model and an NE data model after the MOIs in the MO tree are updated, and transmit the NE configuration model data to an NE database 52, and the NE database 52 updates own NE data. The NE adaptation module returns an incremental configuration success message to a network manager.

The network manager configuration data model library is configured to store static MOCs of the network manager configuration data model.

The dynamic MO template library is configured to store dynamic MOCs of the network manager configuration data model. Attributes of the dynamic MOCs are formed by combining attributes of the static MOCs in the network manager configuration data model library.

The MO tree stores network manager configuration data model-based MOI data.

The NE database stores NE configuration data model data converted from the network manager configuration MOI data.

The system is constructed by the following steps that:

Step 1: a network manager configuration data model library is defined, including MOCs and their association relations. The MOCs may be object classes defined in an industrial standard model, such as a standard interface model defined in 3GPP, or may be manageable object classes in an NE, such as a radio cell in a Global System for Mobile Communication (GSM), wherein a cell number is an attribute of the radio cell, or may be a Radio Unit (RU) radio frequency channel or a carrier on the radio frequency channel. In the embodiments of the disclosure, the MOCs in a network manager configuration data model are called static MOCs. A carrier object exists depending on a radio frequency channel object, and such a relation is called a father-son relation; while a cell object may refer to a radio frequency transmission channel object, and such a relation is called a reference relation. The relations between the MOCs are also defined in the network manager configuration data model;

Step 2: a dynamic MO template library is defined, wherein attributes of dynamic MOCs are derived from the static MOCs, that is, an attribute set of the dynamic MOCs consists of several attributes of several static MOCs. Attributes of the dynamic MOCs include main attributes and auxiliary attributes, the main attributes has a certain association relation with the static MOCs to which the auxiliary attributes belong, the certain association relation may be a father-son relation or a reference relation, and a group of MOI records may be determined by the values of the main attributes and the auxiliary attributes. Dynamic MOI generation rules are defined, wherein the rules are determined by a relation between operation identifiers and the MOCs. The dynamic MOI generation rules defined by a user should meet uniqueness, that is, one dynamic MOI record is generated by several static MOI records, while one static MOI record can only correspond to one dynamic MOI record. For example, a static MO template library includes the following three static MOCs: radio cell, including a main attribute "cell number" and auxiliary attributes "GPS clock offset", "main radio frequency channel number" and the like; RU radio frequency channel, including a main attribute "radio frequency channel number" and auxiliary attributes "receiving mode", "transmission mode" and the like; and radio frequency carrier, including a main attribute "carrier number" and auxiliary attributes "carrier power", "timeslot closing" and the like. If the user needs to frequently modify the transmitted power of several carriers of several radio frequency channels in the cell, then a dynamic MOC "cell carrier power" is pre-defined, including a main attribute "cell number" (derived from the main attribute "cell number" of the static MOC "radio cell") and auxiliary attributes "radio frequency channel number" (derived from the main attribute "radio frequency channel number" of the static MOC "RU radio frequency channel"), "carrier number" (derived from the main attribute "carrier number" of the static MOC "radio frequency carrier") and "carrier power" (derived from the auxiliary attribute "carrier power" of the static MOC "radio frequency carrier"). The dynamic MOI generation rule of "cell carrier power" is that if several static MOIs of the static MOC "radio frequency carrier" simultaneously meet the following three conditions: 1) the operation identifiers of all the MOIs are "modification", 2) the father MOI "RU radio frequency channel" of all the MOIs is referred by the same MOI "radio cell" and 3) only the value of the attribute "carrier power" of all the MOIs is modified in current incremental configuration of the user, then a dynamic MOI is generated, and each attribute of the dynamic MOI is given a value as follows: the value of the main attribute "cell number" takes the value of the main attribute "cell number" of the static MOI "radio cell" in the condition 2), the value of the auxiliary attribute "radio frequency channel number" takes the value of the main attribute "radio frequency channel number" of the father MOI "RU radio frequency channel" of all the static MOIs (the auxiliary attribute has N values if N static MOIs meet the above three conditions), the value of the auxiliary attribute "carrier number" takes the values of the main attributes "carrier number" of all the static MOIs "radio frequency carrier" (the auxiliary attribute has N values if N static MOIs meet the three conditions), and the value of the auxiliary attribute "carrier power" takes the values of the auxiliary attributes "carrier power" of all the static MOI "radio frequency carrier" (the auxiliary attribute has N values if N static MOIs meet the three conditions);

Step 3: a network adapter adaptation module is implemented, and the incremental configuration data of the user is converted into a file in an XML format. Static MOI records are generated by the incremental configuration data of the user according to the static MOCs in the network manager configuration data model, all the static MOI records are matched with the dynamic MOI generation rule in Step 2, dynamic MOIs are generated when a certain dynamic MOI generation rule is met, all the generated dynamic MOI records and the static MOIs unmatched to generate the dynamic MOI records are combined into the XML file, and the XML file is transmitted to the NE. For example: if the user modifies the carrier power of a carrier 1/2 included in a radio frequency channel 1 referred by a cell 1 to be 10/10, modifies the carrier power of a carrier 1/2 included in a radio frequency channel 2 to be 20/20 and adds a cell 2, then four pieces of static MOI records of the radio frequency carrier and one piece of static MOI record of the radio cell are generated, then the dynamic MOI generation rule in Step 2 is matched to generate a dynamic MOI record "cell carrier power" of which the main attribute "cell number" is 1, the auxiliary attribute "radio frequency channel number" is 1/1/2/2, the auxiliary attribute "carrier number" is 1/2/1/2 and the auxiliary attribute "carrier power" is 10/10/20/20, the static MOI of the radio cell, which is unmatched to the dynamic MOI, is still a static MOI, then the XML file includes one piece of dynamic MOI record "cell carrier power" with the operation identifier of "modification" and one piece of radio cell static MOI record with the operation identifier of "addition";

Step 4: an MO tree is constructed, and the NE stores all the static MOIs into the MO tree according to relations in the network manager configuration data model and based on a configuration file for the total operation of a network manager. During incremental operation, the NE adaptation module updates the MO tree according to the configuration file. For the static MOI records, the MO tree is traversed, and after location of a node in the MO tree are found, the node is directly updated according to an operation identifier. For the dynamic MOI records, the MO tree is traversed; firstly, the main attributes are compared with the attributes of the MOIs corresponding to a node in the MO tree, if matching, then the auxiliary attributes are compared with the attributes of the MOIs corresponding to child nodes and associated nodes of the node in the MO tree until all the auxiliary attributes are traversed and the node in the MO tree are found, and then the corresponding node is updated according to the operation identifier. The matching process of the auxiliary attributes is repeated to finish matching all the values of the auxiliary attributes. The in the XML file generated in Step 3 is taken as an example, for a static MOI record "radio cell", a node with a cell number of 2 is directly added after a cell node is found; for a dynamic MOI record "cell carrier power", an MOI node of the radio cell 1 in the MO tree is found, the main attribute "cell number" of the dynamic MOI and the main attribute "cell number" of the MOI "radio cell" are compared, and are determined to be matched if both are valued to be 1. A child node and associated node of "radio cell" are traversed, the matching process for the auxiliary attribute "carrier number" will be carried out subsequently if the auxiliary attribute "radio frequency channel number" of 1 of the dynamic MOI is matched with the MOI of which the main attribute "radio frequency channel number" of the associated node "RU radio frequency channel" of "radio cell" is 1; matching is continued if the auxiliary attribute "carrier number" is matched with the MOI of which the main attribute "carrier number" of the child node "radio frequency carrier" of "RU radio frequency channel" is 1; the auxiliary attribute "carrier power" still exists in the MOI node of which "carrier number" is 1, and the value of the attribute "carrier power" of the MOI node of which "carrier number" is 1 is modified to be 10 according to the operation identifier "modification". The matching process is repeated from the auxiliary attribute "radio frequency channel number" until the values of all the auxiliary attributes are matched, and then the whole process is implemented;

Step 5: an NE adaptation module is implemented, which defines a corresponding relation between the network manager data model and the NE data model, and converts the MOIs of the network manager data MO tree into NE configuration model data, and transmits the NE configuration model data to the NE database; and Step 6: the NE database is constructed, which defines a relation between the NE configuration model data, and stores the NE configuration model data transmitted by the NE adaptation module.

From the above, the disclosure has the following beneficial effects that:

in the schemes provided by the embodiments of the disclosure, the NE management device selects MOIs in the association relation from the generated MOIs after generating MOIs and the operation identifier of each MOI according to the management operation needed to be performed on the NE device, generates a dynamic MOI and an operation identifier of the dynamic MOI according to the selected MOIs, and transmits the dynamic MOI and the operation identifier of the dynamic MOI to the NE device; and the NE device searches an MO tree for the MOI node matched with the attribute values of the dynamic MOI, and updates the matched MOI node according to the operation identifier of the dynamic MOI. Obviously, in the schemes, the NE management device generates the dynamic MOI and the operation identifier of the dynamic MOI for the MOIs in the association relation, and then the NE device is only required to search the MO tree for the MOI node matched with the attribute values of the dynamic MOI, and does not need to search for a location of each MOI in the association relation in the MO tree, so that a lookup workload of the NE device is reduced, and the efficiency of updating the MOIs in the MO tree by the NE device is further improved.

The disclosure is described with reference to a flowchart and/or block diagrams of the method, the device (system) and a computer program product according to the embodiments of the disclosure. It should be understood that each flow and/or block in the flowchart and/or the block diagrams and a combination of the flows and/or blocks in the flowchart and/or the block diagrams may be implemented by virtue of computer program instructions. These computer program instructions may be provided for a universal computer, a special computer, an embedded processor or a processor of other programmable data processing device to generate a machine, so that a device for realizing a function specified in one or more flows in the flowchart and/or one or more blocks in the block diagrams can be generated by virtue of the instructions executed by the computer or the processor of the other programmable data processing device.

These computer program instructions may also be stored in a computer-readable memory capable of guiding the computer or the other programmable data processing device to work in a specific manner, so that a product including an instruction device can be generated by virtue of the instructions stored in the computer-readable memory, and the instruction device realizes the function specified in the one or more flows in the flowchart and/or the one or more blocks in the block diagrams.

These computer program instructions may also be loaded to the computer or the other programmable data processing device, so that a series of operating steps can be executed on the computer or the other programmable data processing device for processing implemented by the computer, and a step for realizing the function specified in the one or more flows in the flowchart and/or the one or more blocks in the block diagrams is provided by the instructions executed on the computer or the other programmable data processing device.

Although the embodiments of the disclosure have been described, those skilled in the art can make additional variations and modifications to the embodiments once knowing basic creative concepts. Therefore, the attached claims are intended to be explained to include the preferred embodiment and all the variations and modifications falling within the scope of the disclosure.

Those skilled in the art can make various modifications and variations to the disclosure without departing from the spirit and scope of the disclosure. Thus, if these modifications and variations of the disclosure fall within the scope of the claims of the disclosure and equivalent technologies thereof, the disclosure is also intended to include these modifications and variations.

INDUSTRIAL APPLICABILITY

According to the disclosure, the NE management device generates a dynamic MOI and an operation identifier of the dynamic MOI for the MOIs in the association relation, and then the NE device is only required to search an MO tree for an MOI node matched with the attribute values of the dynamic MOI, and does not need to search for a location of each MOI in the association relation in the MO tree, so that the lookup workload of the NE device is reduced, and the efficiency of updating the MOIs in the MO tree by the NE device is further improved.

What is claimed is:

1. A data updating method, comprising:
generating, by an Network Element (NE) management device, Managed Object Instances (MOI) and an operation identifier of each MOI according to a management operation needed to be performed on an NE device;
selecting, by the NE management device, MOIs in an association relation from the generated MOIs;
generating, by the NE management device, a dynamic MOI according to the selected MOIs and generating an operation identifier of the dynamic MOI according to an operation identifier of the selected MOIs, wherein the dynamic MOI comprises attribute values corresponding to operation identifiers of the selected MOIs;
transmitting, by the NE management device, the dynamic MOI and the operation identifier of the dynamic MOI to the NE device;
searching, by the NE device, a Managed Object (MO) tree for an MOI node matched with attribute values of the dynamic MOI after receiving the dynamic MOI and the operation identifier of the dynamic MOI, and
updating, by the NE device, the matched MOI node according to the operation identifier of the dynamic MOI;
wherein the generating, by the NE management device, a dynamic MOI according to the selected MOIs and generating an operation identifier of the dynamic MOI according to an operation identifier of the selected MOIs comprises:
matching the selected MOIs with a dynamic MOC in a dynamic MO template library; and
generating the dynamic MOI corresponding to the selected MOIs according to the matched dynamic MOC, and employing the operation identifiers of the selected MOIs as the operation identifier of the dynamic MOI;
wherein the dynamic MOC in the dynamic MO template library comprises a main attribute and at least one auxiliary attribute, and the attributes included in the dynamic MOC are composed of at least one attribute included in static MOCs in an association relation in a network manager configuration data model.

2. The method according to claim 1, wherein the selecting MOIs in an association relation from the generated MOIs comprises:

selecting MOIs belonging to a same Managed Object Class (MOC) and with a same operation identifier; or selecting MOIs belonging to a same MOC; or selecting MOIs with a same operation identifier.

3. The method according to claim 2, when the NE management device transmits the dynamic MOI and the operation identifier of the dynamic MOI to the NE device, the method further comprising: transmitting, by the NE management device, a static MOI and an operation identifier of the static MOI to the NE device, wherein the static MOI is in the generated MOIs but is not in any association relation; and after the NE device receives the static MOI and the operation identifier of the static MOI, the method further comprising: searching the MO tree for the static MOI, and updating the static MOI according to the operation identifier of the static MOI.

4. The method according to claim 1, wherein the matching the selected MOIs with a dynamic MOC in a dynamic MO template library comprises: searching the dynamic MO template library for a dynamic MOC which comprises attributes of the selected MOIs, and employing a found dynamic MOC as the matched dynamic MOC; and the generating a dynamic MOI corresponding to the selected MOIs according to the matched dynamic MOC comprises: generating a dynamic MOI comprising a main attribute value and at least one auxiliary attribute value, wherein the main attribute value included in the dynamic MOI is an attribute value of the main attribute in the matched dynamic MOC corresponding to the selected MOIs, and the at least one auxiliary attribute value included in the dynamic MOI are attribute values of the at least one auxiliary attribute in the matched dynamic MOC corresponding to the selected MOIs.

5. The method according to claim 4, wherein the searching an MO tree for an MOI node matched with attribute values of the dynamic MOI comprises:

searching the MO tree for an MOI node which comprises the main attribute value of the dynamic M01; matching attribute values in an MOI node, which has an association relation with a found MOI node, with the at least one auxiliary attribute value of the dynamic M01; and determining a successfully matched MOI node as the MOI node matched with the attribute values of the dynamic MOI.

6. The method according to claim 1, when the NE management device transmits the dynamic MOI and the operation identifier of the dynamic MOI to the NE device, the method further comprising: transmitting, by the NE management device, a static MOI and an operation identifier of the static MOI to the NE device, wherein the static MOI is in the generated MOIs but is not in any association relation; and after the NE device receives the static MOI and the operation identifier of the static MOI, the method further comprising: searching the MO tree for the static MOI, and updating the static MOI according to the operation identifier of the static MOI.

7. The device according to claim 1, wherein the network manager adaptation module is configured to match the selected MOIs with the dynamic MOC in the dynamic MO template library and generate the dynamic MOI corresponding to the selected MOIs according to the matched dynamic MOC by a following way:

searching the dynamic MO template library for a dynamic MOC which comprises attributes of the selected MOIs, and employing a found dynamic MOC as the matched dynamic MOC; and generating a dynamic MOI which comprises a main attribute value and at least one auxiliary attribute value, wherein the main attribute value included in the dynamic MOI is an attribute value of the main attribute in the matched dynamic MOC corresponding to the selected MOIs, and the at least one auxiliary attribute value included in the dynamic MOI are attribute values of the at least one auxiliary attribute in the matched dynamic MOC corresponding to the selected MOIs.

8. The method according to claim 1, wherein the selected MOIs from the generated MOIs have an association relation between each other.

9. A data synchronization system, comprising:

a Network Element (NE) management device, configured:

to generate Managed Object Instances (MOI) and an operation identifier of each MOI according to a management operation needed to be performed on an NE device, to select MOIs in an association relation from the generated MOIs, to generate a dynamic MOI according to the selected MOIs and to generate an operation identifier of the dynamic MOI according to an operation identifier of the selected MOIs, wherein the dynamic MOI comprises attribute values corresponding to operation identifiers of the selected MOIs, and to transmit the dynamic MOI and the operation identifier of the dynamic MOI to the NE device;

and the NE device, configured:

to search a Managed Object (MO) tree for an MOI node matched with attribute values of the dynamic MOI after receiving the dynamic MOI and the operation identifier of the dynamic MOI, and to update the matched MOI node according to the operation identifier of the dynamic MOI;

wherein the generating, by the NE management device, a dynamic MOI according to the selected MOIs and generating an operation identifier of the dynamic MOI according to an operation identifier of the selected MOIs comprises:

matching the selected MOIs with a dynamic MOC in a dynamic MO template library; and generating the dynamic MOI corresponding to the selected MOIs according to the matched dynamic MOC, and employing the operation identifiers of the selected MOIs as the operation identifier of the dynamic MOI;

wherein the dynamic MOC in the dynamic MO template library comprises a main attribute and at least one auxiliary attribute, and the attributes included in the dynamic MOC are composed of at least one attribute included in static MOCs in an association relation in a network manager configuration data model.

10. The system according to claim 9, wherein the selected MOIs from the generated MOIs have an association relation between each other.

11. A Network Element (NE) management device, comprising:
a network manager adaptation module, configured:
to generate Managed Object Instances (MOI) and an operation identifier of each MOI according to a management operation needed to be performed on an NE device,
to select MOIs in an association relation from the generated MOIs, and
to generate a dynamic MOI according to the selected MOIs and to generate an operation identifier of the dynamic MOI according to an operation identifier of the selected MOIs, wherein the dynamic MOI comprises attribute values corresponding to operation identifiers of the selected MOIs; and
a configuration interface module, configured to transmit the dynamic MOI and the operation identifier of the dynamic MOI to the NE device;
wherein the network manager adaptation module is configured to generate a dynamic MOI according to the selected MOIs and to generate an operation identifier of the dynamic MOI according to an operation identifier of the selected MOIs by a following way:
matching the selected MOIs with a dynamic MOC in a dynamic MO template library; and
generating the dynamic MOI corresponding to the selected MOIs according to the matched dynamic MOC, and employing the operation identifiers of the selected MOIs as the operation identifier of the dynamic MOI;
wherein the dynamic MOC in the dynamic MO template library comprises a main attribute and at least one auxiliary attribute, and the attributes included in the dynamic MOC are composed of at least one attribute included in static MOCs in an association relation in a network manager configuration data model.

12. The device according to claim 11, wherein the network manager adaptation module is configured to select the MOIs in the association relation from the generated MOIs by following ways:
selecting MOIs belonging to a same Managed Object Class (MOC) and with a same operation identifier; or
selecting MOIs belonging to a same MOC; or
selecting MOIs with a same operation identifier.

13. The device according to claim 12, wherein the configuration interface module is further configured to transmit a static MOI and an operation identifier of the static MOI to the NE device while transmitting the dynamic MOI and the operation identifier of the dynamic MOI to the NE device, wherein the static MOI is included in the generated MOIs but is not in any association relation.

14. The device according to claim 11, wherein the configuration interface module is further configured to transmit a static MOI and an operation identifier of the static MOI to the NE device while transmitting the dynamic MOI and the operation identifier of the dynamic MOI to the NE device, wherein the static MOI is included in the generated MOIs but is not in any association relation.

15. The device according to claim 11, wherein the selected MOIs from the generated MOIs have an association relation between each other.

* * * * *